Aug. 12, 1941.   C. E. GULLBERG   2,252,001
SUPPORTING AND HOISTING DEVICE
Filed March 20, 1940   2 Sheets-Sheet 1
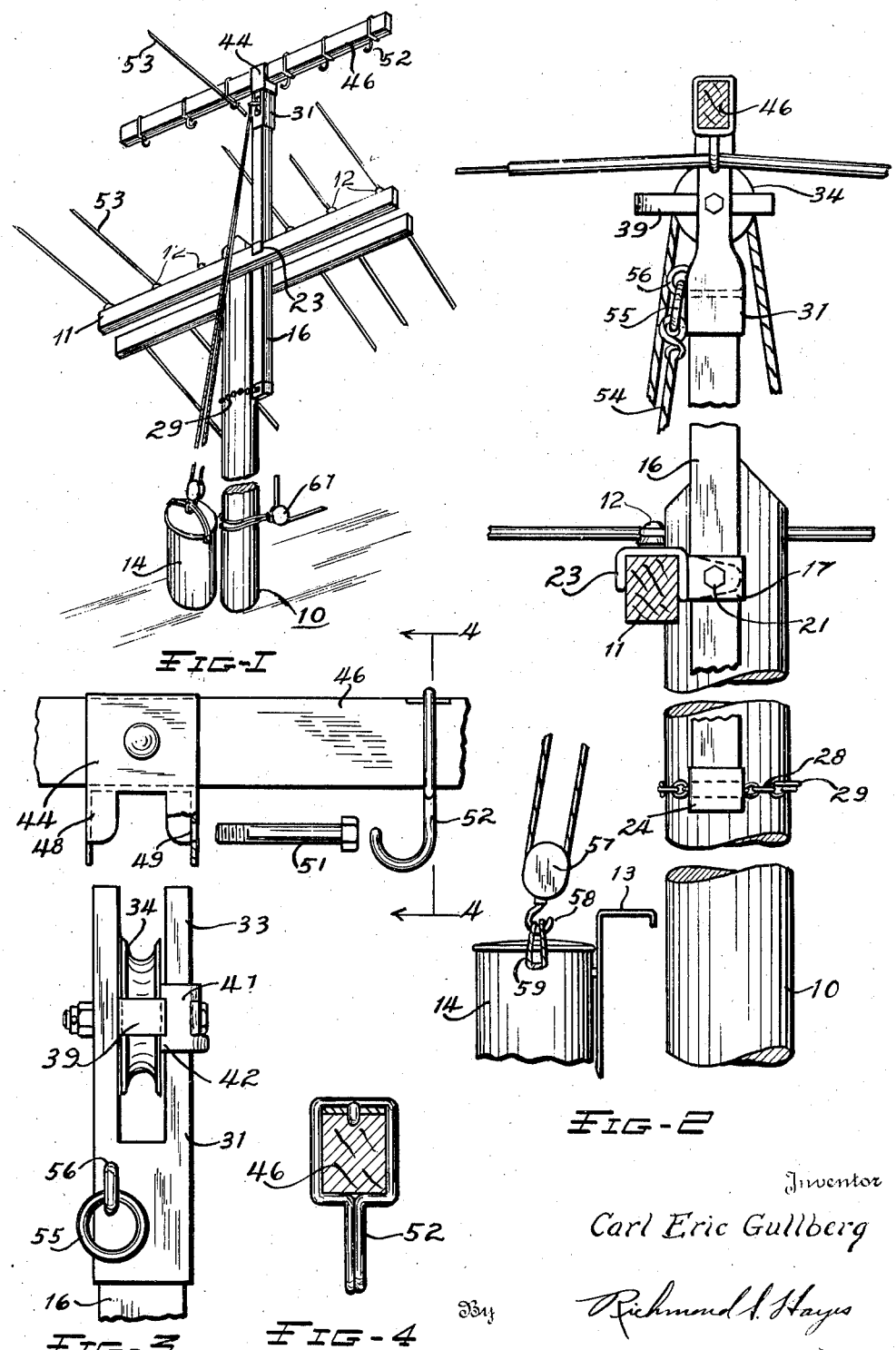
Inventor
Carl Eric Gullberg
Richmond A. Hayes
Attorney

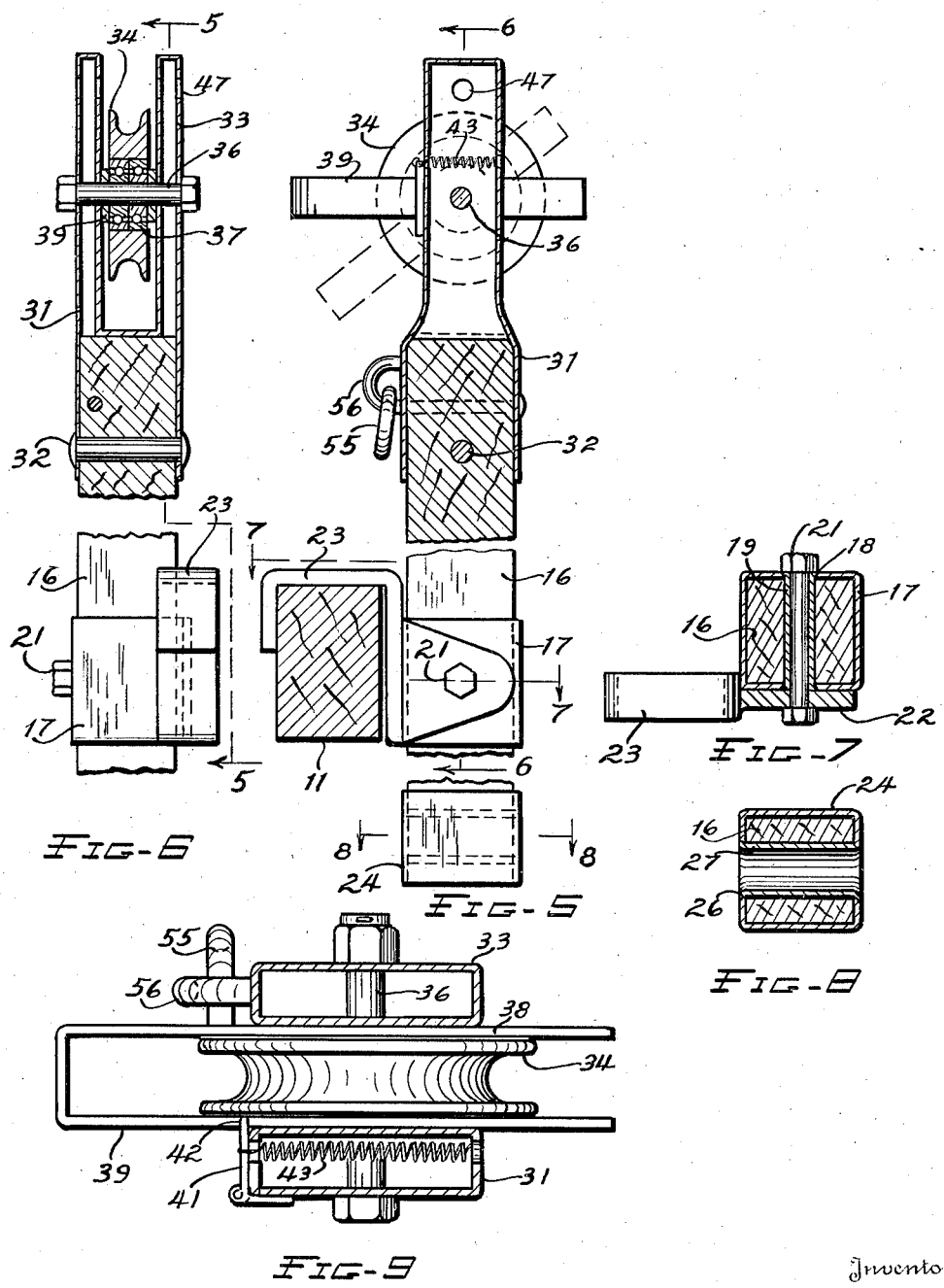

Patented Aug. 12, 1941

2,252,001

UNITED STATES PATENT OFFICE 2,252,001

SUPPORTING AND HOISTING DEVICE

Carl Eric Gullberg, Fredonia, N. Y.

Application March 20, 1940, Serial No. 325,083

12 Claims. (Cl. 254—139)

This invention relates to improvements in portable hoisting and supporting devices.

In its present form the invention discloses a bar of such construction and material that it may be easily and conveniently attached to and form a continuation of an upstanding member, such, for example, as a telephone or power line pole. This bar, when equipped with suitable tackle, serves to sustain the weight of large or cumbersome objects while they are being moved from one level to another. On the upper end of the bar is an arm that is adapted to support objects in a position somewhat remote from the upright to which the bar is attached.

The invention, while adaptable for hoisting and supporting equipment of many kinds, finds particular applicability to the installation, replacement, and repair of equipment of light and power companies. In the establishment of new power lines many poles are erected and fitted with one or more cross-arms. These arms mount suitable insulators that in turn support cables capable of transmitting electrical energy of many thousand volts. At frequent intervals in these lines transformers of various kinds and sizes are required. These transformers must, for reasons of safety and convenience, be located well up on the poles and as near as possible to the cables with which they are connected, and are preferably supported by one or more of the cross-arms on the pole. After the lines have been established, constant maintenance attention is required to assure substantially uninterrupted service to the many consumers of current. The equipment may become old, damaged by storm or accident, or need replacement to meet different current consumer conditions. Thus, the equipment on power line poles is almost constantly being tended by linemen, and since the cables of these lines transmit extremely high voltages, it is evident that the accident and death hazard in power line maintenance is extreme.

Prior to this invention some few devices of this general nature have been provided for the purpose of improving the convenience and safety of linemen in the erection, maintenance and replacement of equipment of power companies. These devices, however, have either been of insufficient strength to sustain the weight of some of the equipment, such, for example, as transformers, or of such rugged construction as to render their mounting on a pole a difficult task at best. Furthermore, they frequently include metal parts, such as arms, braces, etc., that would constitute a definite hazard when the pole on which the device is to be installed carries cables charged with several thousand volts of electricity.

It is, therefore, the purpose of the present invention to provide a portable hoisting and supporting device that, while adaptable for many uses, is particularly well suited for use in the installation and replacement of equipment on the poles of power companies. The device is sufficiently rugged to sustain the weight of any equipment used by the power company and, due to its light weight, may be readily carried up a pole and set in place through the efforts of one workman. Additionally, the device is fully insulated and thus, should it come into contact with any of the cables while it is being set up or removed, there is no danger of shock to a workman. It frequently occurs that breaks in lines must be repaired, transformers removed and replaced, and new insulators and cross-arms substituted for those already in use, without shutting off the current in the lines on which such work is to be done. The present invention is applicable to and adapted to extend above the pole, being in the nature of a continuation thereof. Thus, when suitable tackle and a cross-arm are attached to the upper end of the device it is possible to first raise the cables from off the cross-arm on which they are normally supported on to the cross-arm of the device, and then by means of the tackle raise or lower equipment to the level of the cross-arm of the pole without danger of shock or other accident to the workmen.

Other advantages than those already indicated will be more fully brought out in the following specification, taken in conjunction with the accompanying drawings; and in which Figure 1 is a perspective view of the invention as it appears in use in the installation of power line equipment;

Figure 2 is an enlarged side elevational view of the upper end of a pole or other upright showing the method of attaching the invention thereto;

Figure 3 is an enlarged fragmentary front elevational view of the upper end of the device showing the method of attaching a cross-arm thereto;

Figure 4 is a vertical transverse sectional view through the cross-arm, taken substantially as indicated at 4—4 of Figure 3;

Figure 5 is an enlarged side view of the device partly in section, being taken substantially as indicated at 5—5 of Figure 6;

Figure 6 is a vertical sectional view of the device taken substantially as indicated at 6—6 of Figure 5;

Figure 7 is a horizontal sectional view taken substantially as indicated at 7—7 of Figure 5;

Figure 8 is a horizontal sectional view taken substantially as indicated at 8—8 of Figure 5; and Figure 9 is a greatly enlarged plan view of the pulley block located at the upper end of the device.

Reference is now had to the drawing wherein the numeral 10 is employed to indicate a pole or other upright to which the present invention is applicable. In the present illustration of the invention the pole 10 is of a type used to support cables of a light and power company and is fitted with one or more pairs of cross-arms 11. Suitable insulators 12 are located at specified intervals on the upper edges of the cross-arms and serve as a means for fastening and supporting cables.

To more clearly illustrate the structure and applicability of the invention it is assumed that a transformer is required to be installed at or adjacent the cross-arms 11 of the pole 10. Transformers of this type weigh from 200 to 2000 lbs. and must be mounted as close to the cables with which they are to be connected as is possible. They are generally, therefore, provided with one or more hangers 13 that are attached to or form a part of a transformer, as illustrated by the numeral 14. The hanger 13 is adapted to engage that portion of one of the cross-arms 11 adjacent its connection with the pole 10.

The present invention comprises an extremely strong bar 16, preferably formed from or encased with non-conductive material, and is of such moderate weight that a single workman can raise it to the top of a pole. At a convenient point between its ends, the bar is enclosed by a plate 17. An opening 18 is made through the bar and plate and, if found desirable, a sleeve 19 inserted in the opening. A bolt 21 projects through the opening and serves to secure the plate in place. The bolt is of sufficient length to engage and secure to the bar an arm 22 of a hanger 23. This hanger is engageable with one of the cross-arms 11 of the pole 10, substantially as indicated in Figures 1, 2 and 5 of the drawings. The lower end of the bar may be enclosed by a further plate 24. An opening 26 is formed in the bar and plate, and a sleeve 27 may be mounted in this opening. A chain or cable 28 projects through the opening 26 and encircles the pole 10, being provided with a clamp or binder 29 by which this end of the bar is rigidly fixed to the pole.

At the upper end of the bar 16 is a metal cap 31. This cap encloses the bar and is secured thereto by a suitable rivet or bolt 32. In one form the cap 31, above its connection with the bar 16, is formed to provide spaced, upstanding arms 33. As illustrated, each arm may be hollow and forms an integral part of that portion of the member 31 engaged with the bar. These arms constitute the support for a pulley or sheave 34 by means of a shaft 36. The pulley 34 is supported by bearings 37 that are carried by the shaft 36, and is, therefore, freely rotatable. Between the edges of the pulley 34 and the inner faces of arms 33 space is provided for mounting the ends 38 of a bail 39. Any suitable means may be provided for positioning the bail 39, such, for example, as a plate 41 having arms 42 engaged above and beneath one of the arms 38 of the bail. The plate 41 is pivotally joined to one of the arms 33 and held in the position shown in Figure 9 of the drawings by means of a spring 43. When it is desired to rotate the bail from the positions shown in Figures 5 and 9 to a position opposite thereto, the plate is withdrawn against tension of spring 43, the bail rotated, and the plate then engaged with an arm 38 adjacent its end. The bail 39 serves the purpose of preventing a cable or rope from inadvertently being dislodged from the pulley 34 and, as occasion may require, may be rotated to the dotted line position in Figure 5 and a cable or block attached thereto for use in conjunction with the pulley 34.

The arms 33 of the cap 31 are intended to accommodate a bracket 44 that is rigidly secured to the central portion of a cross-arm 46 and to this end concentric openings 47 are made in the arms. The bracket 44 includes depending flanges 48 having openings 49 therethrough. When the bracket is mounted on the arms 33, openings 47 and 49 register and a bolt 51 firmly secures these parts together. The cross-arm 46, attached to the bar 16, may be of substantially the same general proportions as cross-arms 11 of the pole 10. The arm 46, however, is of relatively light weight yet strong material that in itself acts as an insulator or may be coated with an insulating substance. Secured to this arm, in positions corresponding to the customary spacing of cables, are a number of hooks 52. These hooks may take the form shown in Figures 3 and 4 of the drawings and are each adapted to support a cable, such as are indicated at 53 in Figure 1 of the drawings, or any other equipment it is desired to remove from the immediate vicinity of the cross-arms 11.

With the illustration of Figure 1 in mind, it is assumed that it has become necessary to install a distributing transformer 14 on the pole 10. A lineman raises the bar 16 to a position such that the hanger 23 engages one of the cross-arms 11. The chain or cable 28 is made fast to the pole 10 and the cross-arm 46 set in place on the upper end of the bar, as already described. In the present instance, one end of a hoisting rope 54 is attached to a ring 55, carried by an eye-bolt 56. The rope projects through a block 57 and then over the pulley 34. A hook 58 on the block is engaged with a suitable bale 59 of the transformer 14. The free end of the rope extends downwardly on that side of the pole opposite from the transformer 14 and, for convenience, may be carried through a block 61 temporarily secured in any suitable manner to the base of the pole 10. It is apparent that the cables 53 carried by the cross-arms 11 might interfere during raising and mounting the transformer 14. The cables nearest the point at which the transformer is to be mounted are, therefore, disconnected one by one from the cross-arms 11 and raised to engage hooks 52 of the cross arm 46. It will, of course, be understood that during this work suitable insulator sleeves cover the cables. When the necessary cables have been raised to the cross-arms 46, the rope 53 is tightened and the transformer drawn up the pole to a position such that the hanger 13 thereof will engage one of the cross-arms 11. The raised cables may again be lowered, connection made with the transformer, and the cross-arm 46 and bar 16 dismantled and lowered to the ground.

It will be understood that the present invention is extremely useful where it becomes necessary to remove and replace worn out cross-arms, such as arms 11. Under these circumstances, the hanger 23 is removed from the bar 16 and the bar is secured directly to the pole 10 by means of a longer bolt than the bolt 21. This bolt projects through one of several holes that are normally provided in the pole adjacent the cross-arms. When the bar 16 and bar cross-arm 46 have been set up, all of the cables 53 of the cross-arms 11 will be raised into engagement with hooks 52. The cross-arms 11 may then be removed from the pole and replaced. The device is used similarly when it becomes necessary to repair the cables, cut and take up slack, replace insulators, or carry on other repair or replacement work. It will be understood, of course, that if one or more cross-arms 11 are provided on the pole, the lower cross-arms can be relieved of the cables by temporarily attaching them to the uppermost cross-arm, and that the present invention, in its illustrated form, provides means for the installation and removal of heavy equipment such as the transformer 14, as well as replacement and repair of equipment carried by the uppermost cross-arm.

Although applicant has shown and described only one form and application of his invention, it will be understood by those skilled in the art that other forms and adaptations of the invention may be made without departing from the spirit and scope of the invention as defined in the hereunto annexed claims.

Having thus set forth my invention what I claim as new and for which I desire protection by Letters Patent is:

1. A device for attachment to an upright comprising a bar, means for rigidly securing said bar to said upright in a position to serve as an extension thereof, a cap member on one end of said bar, said member mounting a pulley, and a transversely disposed arm joined to said member, said arm and said cap member cooperating to form a cable guard for said pulley.

2. A device for attachment to an upright comprising a bar, means for rigidly securing said bar to said upright in a position to serve as an extension thereof, a cap member on one end of said bar, a cross arm, and means fitting and securing said cross arm to said member.

3. A device for attachment to an upright comprising a bar, means for rigidly securing said bar to said upright in a position to serve as an extension thereof, a cap member on one end of said bar, a pulley mounted in said member, a cross arm, and means securing said cross arm to said member, said means and said member cooperating to form a cable guard for said pulley.

4. A device for attachment to an upright comprising a bar, means for rigidly securing said bar to said upright in a position to serve as an extension thereof, a forked cap member enclosing one end of said bar, a pulley mounted between the forks of said member, a cross arm, and means securing said cross arm to the forks of said member, said means cooperating with the forks to form a cable guard for said pulley.

5. A device for attachment to an upright comprising a bar, means for rigidly securing said bar to said upright in a position to serve as an extension thereof, a cap member enclosing one end of said bar, a cross arm, a bracket secured centrally of said arm, said bracket being engaged with and secured to the upper end of said member and serving to rigidly position said cross arm on said bar.

6. An attachment device for use as an extension of an upright pole that is fitted with a cross arm adapted to support cables, said device comprising a bar, means intermediate the ends of said bar engageable with the cross arm of said pole and serving to position a portion of said bar above said cross arm, and clamp means adjacent the lower end of said bar engageable with said pole.

7. An attachment hoisting device for use on an upright pole that is fitted with a cross arm adapted to support cables, said device comprising a bar, a hanger joined to the intermediate portion of said bar, said hanger being engageable with said cross arm, clamp means adjacent the lower end of said bar engageable with said pole, and a pulley mounted in the other end of said bar.

8. An attachment hoisting device for use on an upright pole that is fitted with a cross arm adapted to support cables, said device comprising a bar, a hanger, means mounting said hanger on said bar for engagement from either side with a cross arm of said pole, a bracket adjacent one end of said bar, means carried by said bracket for engaging and securing said bar to said pole, and a pulley mount on the other end of said bar.

9. An attachment hoisting device for use on an upright pole that is fitted with a cross arm adapted to support cables, said device comprising a bar, a hanger joined to said bar intermediate its ends, said hanger being engageable with a cross arm of said pole, a bracket enclosing one end of said bar, means carried by said bracket for engaging and securing said bar to said pole, a bracket enclosing the other end of said bar, a pulley mounted in said last named bracket, and cable guard means on said bracket adjacent said pulley.

10. An attachment hoisting and supporting device for use on an upright pole having a cable supporting cross arm, comprising a bar, a hanger, means intermediate the ends of said bar mounting said hanger, said hanger being engageable with a cable carrying cross arm of said pole to locate a portion of said bar above said pole, means adjacent the lower end of said bar engageable with said pole and serving to rigidify said bar, a cap member on the upper end of said bar, a pulley carried by said cap member, transversely disposed means on the upper end of said bar, said last means, during use of said device as a hoist, serving to support cables normally carried by the cross arm of said pole.

11. An attachment hoisting and supporting device for use on a power line pole having a cable supporting cross arm, said device comprising a bar, a hanger on said bar engageable with said cross arm and serving to position a part of said bar above the end of said pole, means on the lower end of said bar engageable with said pole and preventing displacement of said hanger from said cross arm, a cap member on the upper end of said bar, a cross member, and means on said cross member engaged with said cap member, said cross member, during use of said device as a hoist, serving to support current carrying cables normally carried by a cross arm of said pole.

12. An attachment hoisting and supporting device for use on a power line pole having a cable supporting cross arm, said device comprising a bar, a hanger, means on said bar mounting said hanger for engagement with a pole cross arm at either side of said bar, said hanger causing said bar to form in part an extension of said pole, means adjacent one end of said bar engageable with said pole and preventing displacement of said hanger from said cross arm, a cap member on the extended end of said bar, said member being formed to mount a pulley, a cross member for said bar, a bracket on said cross member engaged with the upper end of said cap member and forming a pulley cable guard, and hook means on said cross member adapted to support cables normally supported by the pole cross arm.

CARL ERIC GULLBERG.